United States Patent Office 3,546,131
Patented Dec. 8, 1970

3,546,131
STABILIZED CYANMETHEMOGLOBIN REAGENT CONTAINING FERRICYANIDE, CYANIDE AND POLYVINYLPYRROLIDONE
Harold Stern, West Orange, N.J., and John E. Reardon, Los Angeles, Calif., assignors to Uni-Tech Chemical Manufacturing Company, Sun Valley, Calif., a corporation of California
No Drawing. Filed July 5, 1968, Ser. No. 747,762
Int. Cl. C08h 17/58; G01n 33/16
U.S. Cl. 252—408                            9 Claims

ABSTRACT OF THE DISCLOSURE

A dry formulated reagent containing ferricyanide and cyanide for use in the photometric determination of hemoglobin in human and animal blood comprising a water soluble macromolecular desiccant, such as polyvinylpyrrolidone, to enhance markedly its resistance to light, heat and cold, and aging.

---

This invention relates to cyanmethemoglobin reagents containing ferricyanide and cyanide used in the photometric determination of hemoglobin in blood, and more particularly to a dry formulated reagent employing a water soluble macromolecular desiccant, such as polyvinylpyrrolidone, to enhance its resistance to light, heat and cold, and aging.

Human and animal blood yield a stable hemoglobin derivative, cyanmethemoglobin, in an aqueous alkaline solution containing ferrycyanide and cyanide. Ferricyanide oxidizes hemoglobin iron from the ferrous to the ferric state to form methemoglobin, which then reacts with cyanide to form cyanmethemoglobin. When measured spectrophotometrically at 540 m$\mu$, the red pigment of the reaction product is proportional to the concentration of hemoglobin in the sample being analyzed. This determination, the classic Drabkin's procedure, is in wide use in medical diagnostic laboratories and biological testing facilities.

Ordinary cyanmethemoglobin reagents are sensitive to light and to both heat and freezing cold. In addition, they tend to deteriorate spontaneously with age. For these reasons it is necessary to use great care in their manufacture, shipping, and storage. Even when they are processed dry under light-controlled conditions, packed in opaque or colored containers, and stored under refrigeration, they have a shelf life expectancy of less than four months. Normally, because of the precise requirements of the photometric procedure, the possibility of deterioration renders them unreliable and unsafe for clinical use after only two or three months. Exposed to light, or allowed to stand at room temperature, they become degraded beyond usefulness within 24 hours.

The explanation for the observed instability and sensitivity of these reagents is not clear; however, it is known that they demonstrate a marked hygroscopic character; and it is hypothesized that their absorption of moisture either causes or accelerates the degradation process.

Common desiccating techniques, such as heating the reagents themselves, humidification of the storage area, and use of diliquescent materials in the reagent container have proved to be either impracticable or ineffectual as solutions to this perplexing and costly problem.

It has been found that a high degree of stability and resistance to the influence of light, high and low temperatures, and aging can be achieved by formulating and treating the standard cyanmethemoglobin reagent with certain water soluble desiccants having a macromolecular structure with an average molecular weight above about 10,000. Polyacrylamide, gelatin, dextrin, soluble alkali metal cellulose salts, and the hydrolyzed polyvinyl alcohol derivatives are examples of such materials; however, perhaps the most outstanding results have been achieved with polyvinylpyrrolidone, which has an average molecular weight of about 60,000.

Little is known about the mechanics by which these materials stabilize the reagent. Experimental evidence indicates that in the treatment process their relatively enormous molecules allow them to envelope and encapsulate the grannular ferricyanide and cyanide.

Regardless of the mechanics involved, the object of the subject invention is to provide a dry formulated cyanmethemoglobin reagent which is resistant to light, heat and cold, and aging. The following examples of results achieved in the practice of the invention will serve to illustrate the degree to which this object has been met.

EXAMPLE I

A dry reagent having the following composition was compounded:

|  | Gm. |
|---|---|
| Polyvinylpyrrolidone | 50.0 |
| NaHCO$_3$ | 50.0 |
| K$_3$[Fe(CN)$_6$] | 9.9 |
| KCN | 2.6 |

The polyvinylpyrrolidone was milled to powder, and approximately 45 grams of this thoroughly mixed with the powdered potassium bicarbonate. The balance of the polyvinylpyrrolidone was separately blended with the finely granulated potassium cyanide. At the conclusion of this blending it was observed on close examination that the normally somewhat moist cyanide granules were substantially covered with a thin relatively uniform layer of polyvinylpyrrolidone and exhibited noticeably reduced compactability. The potassium ferricyanide was then combined and mixed with the previously compounded polyvinylpyrrolidone-potassium bicarbonate mixture, and the resulting mixture batch blended with the coated cyanide material to form a substantially homogeneous product.

This reagent was transferred to an amber glass container and stored at room temperature. Over a period of nearly four years random samples taken from the container were made up into working aqueous solutions and used in the customary photometric cyanmethemoglobin determination of hemoglobin in lyophylized human blood control standards. In all of these determinations the results were well within acceptable limits, and the reagent showed no loss of potency. Neither was there any trace of the darkening of the dry reagent material which is associated with deterioration.

EXAMPLE II

A dry reagent having the following composition was compounded:

|  | Gm. |
|---|---|
| Polyvinylpyrrolidone | 22.4 |
| NaHCO$_2$ | 50.4 |
| K$_3$[Fe(CN)$_6$] | 10.0 |
| KCN | 2.6 |

The procedure outlined in Example I was followed in the preparation of this material, except that about 20 grams of the polyvinylpyrrolidone was combined initially with the bicarbonate and the remaining 2.4 grams used to coat the cyanide granules before final mixing of the entire mass.

EXAMPLE III

A dry reagent having the following composition was compounded:

|  | Gm. |
|---|---|
| Polyvinylpyrrolidone | 50.0 |
| NaHCO$_3$ | 50.0 |
| K$_3$[Fe(CN)$_6$] | 10.0 |
| KCN | 2.6 |

The procedure outlined in Example I was likewise followed in the preparation of this material.

The reagents of Examples II and III were stored in amber glass bottles on open laboratory shelves at room temperature for periods in excess of 18 months, with no sign of discoloration or deterioration.

Samples taken from these two bottles were irradiated for two weeks under direct exposure to an electric lamp emitting ultraviolet light in the range of 2800 to 3200 angstroms. Simultaneously a control sample taken from a freshly prepared batch of regular Drabkin's reagent substantially identical with the material of Examples II and III except for the omission of the polyvinylpyrrolidone, was irradiated under the same ultraviolet lamp.

The first two samples remained unchanged in color, while the third darkened markedly. The treatment of samples in this manner is roughly equivalent to the normal exposure to light the same materials would be expected to receive in the laboratory under normal conditions in six months to a year.

Additional samples taken from the polyvinylpyrrolidone-treated materials of Examples II and III and a control sample of regular Drabkin's reagent without polyvinylpyrrolidone were placed in an incubator and maintained at 37° C. for two weeks.

The untreated sample darkened quickly, while the treated samples remained unchanged in color.

The samples of treated reagent which had been irradiated with ultraviolet light and those which had been incubated were made up into working solutions and used in running hemoglobin determinations on controlled hemoglobin standards. In all cases the results were within acceptable limits.

Samples taken from the treated reagents of Examples II and III were made up into working solutions and stored for two weeks at 4° C., at room temperature, and at 37° C. Optical density measurements were then made on each of these samples from 220 mμ to 450 mμ on a recording spectrophotometer. All of the samples exhibited remarkable stability and proved to be fully useful in determining the hemoglobin content in blood.

It is well known that regular cyanmethemoglobin reagent in solution cannot be kept at room temperature, much less at 37° C., for even 24 hours without some spectral shift in absorbance.

Finally, stock solutions of Drabkin's reagent containing amounts of polyvinylpyrrolidone ranging from 1.25% to 22.5% by weight of solids were made up in polyvinyl vials, frozen, and maintained at −20° C. for 12 hours. At the end of this period they were removed from the freezer and allowed to equilibrate naturally to 25° C. Absorbances of these frozen samples and of unfrozen reference samples were then taken at 420 mμ.

It is a well established fact that regular untreated cyanmethemoglobin reagent undergoes a drastic shift in absorbance on freezing and thawing. The results of this experiment demonstrated clearly under conditions simulating normal field use that the same reagent treated with as little as 6% by weight of polyvinylpyrrolidone is cryostable and retains its usefulness even after freezing and thawing.

In summary, it has been demonstrated that the addition as much as 50% by weight of a water soluble macromolecular desiccant to common Drabkin's cyanmethemoglobin reagent has little or no effect on its absorbance characteristics or usefulness in the photometric determination of blood hemoglobin. The treatment of this reagent with materials of this class, such as polyvinylpyrrolidone, sharply increases its stability and resistance to light, heat and cold, and aging both in its dry form and in solution. Further, the presence of as little as 6% of these materials effectively provides protection for the otherwise highly unstable reagent under freezing conditions.

What is claimed is:
1. A formulated cyanmethemoglobin reagent stabilized against the adverse effects of light, heat and cold, and aging comprising: a ferricyanide; a cyanide; and a water soluble macromolecular desiccant selected from the group consisting of polyvinylpyrrolidone, the polyacrylamides, gelatin, dextrin, the alkali metal salts of cellulose, and the hydrolyzed polyvinyl alcohol derivatives.

2. The reagent as defined in claim 1 in which said desiccant is polyvinylpyrrolidone.

3. The reagent as defined in any one of claims 1 and 2 in which:
   said ferricyanide is potassium ferricyanide or sodium ferricyanide;
   said cyanide is potassium cyanide; and
   said reagent also comprises potassium bicarbonate or sodium bicarbonate.

4. The reagent as defined in claim 3 in which said constituents are in approximate proportions:
   8.9%–11.4% ferricyanide;
   2.1%–2.4% cyanide;
   28.6%–44.5% macromolecular desiccant; and
   44.5%–57.6% bicarbonate.

5. The reagent as defined in claim 3 in which said constituents comprise approximately:
   10 grams ferricyanide;
   2.5 grams cyanide;
   50 grams macromolecular desiccant; and
   50 grams bicarbonate.

6. A process for compounding a stable dry formulated reagent containing bicarbonate, ferricyanide and cyanide for use in the photometric determination of hemoglobin in blood comprising:
   blending the cyanide with a sufficient quantity of a water soluble macromolecular desiccant selected from the group consisting of polyvinylpyrrolidone, the polyacrylamides, gelatin, dextrin, the alkali metal salts of cellulose, and the hydrolyzed polyvinyl alcohol derivatives to substantially cover the cyanide granules with a thin relatively uniform coating of the desiccant material;
   mixing the bicarbonate with between about 50% and 100% of its weight of the same desiccant material;
   combining and mixing the ferricyanide with the previously prepared mixture of bicarbonate and desiccant; and
   combining and mixing the previously prepared mixture of ferricyanide, bicarbonate and desiccant with the previously prepared desiccant-coated cyanide to form a substantially homogeneous product.

7. The process as defined in claim 6 in which said bicarbonate is sodium bicarbonate, said ferricyanide is potassium ferricyanide, said cyanide is potassium cyanide.

8. The process as defined in claim 6 in which said water soluble macromolecular desiccant is polyvinylpyrrolidone.

9. The process as defined in any one of claims 6, 7 and 8 in which the constituents thereof comprise approximately:
   10 gms. ferricyanide;
   2.5 gms. cyanide;
   25 to 50 gms. macromolecular desiccant; and
   50 gms. bicarbonate.

References Cited
UNITED STATES PATENTS 3,298,789   1/1967   Mast _____ 23—230

HAROLD ANSHER, Primary Examiner

M. E. McCAMISH, Assistant Examiner

U.S. Cl. X.R.
23—230; 424—80